US011770755B2

(12) United States Patent
Gan

(10) Patent No.: US 11,770,755 B2
(45) Date of Patent: Sep. 26, 2023

(54) SYSTEMS AND METHODS FOR DYNAMICALLY PROVIDING NETWORK ACCESS VIA A MOBILE ACCESS GATEWAY

(71) Applicant: Verizon Patent and Licensing Inc., Basking Ridge, NJ (US)

(72) Inventor: Seng Gan, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 195 days.

(21) Appl. No.: 17/484,130

(22) Filed: Sep. 24, 2021

(65) Prior Publication Data

US 2023/0100882 A1  Mar. 30, 2023

(51) Int. Cl.
*H04W 48/04* (2009.01)
*H04W 48/20* (2009.01)
*H04W 76/18* (2018.01)

(52) U.S. Cl.
CPC .......... *H04W 48/04* (2013.01); *H04W 48/20* (2013.01); *H04W 76/18* (2018.02)

(58) Field of Classification Search
CPC ..... H04W 48/04; H04W 48/20; H04W 76/18; H04W 88/04; H04W 48/02
See application file for complete search history.

(56) References Cited

U.S. PATENT DOCUMENTS

2011/0131338 A1* 6/2011 Hu .................. H04W 76/11
709/229

FOREIGN PATENT DOCUMENTS

EP  2785109 A1 * 10/2014 ............ H04W 48/17
EP  3236694 A1 * 10/2017 ............ H04W 36/12

* cited by examiner

*Primary Examiner* — Marisol Figueroa

(57) ABSTRACT

A mobile gateway may provide access to one or more networks based on a variety of configurable parameters, constraints, etc. A Mobile Gateway Management System ("MGMS") may maintain different sets of rules, parameters, etc. associated with multiple different mobile gateways, such that a network may be able to determine whether to provide access to a particular mobile gateway based on location parameters, temporal parameters, account parameters, or other parameters. When access is granted to the network based on the parameters, the mobile gateway may serve as an interface between one or more User Equipment ("UEs") and the network.

20 Claims, 12 Drawing Sheets

SYSTEMS AND METHODS FOR DYNAMICALLY PROVIDING NETWORK ACCESS VIA A MOBILE ACCESS GATEWAY

BACKGROUND

Wireless network providers may offer various types of modems, gateways, or other devices via which users may obtain access to a network, such as the Internet. Some such devices may be "fixed" devices that are configured to provide network access at one location, while other devices (sometimes referred to as "hotspots") may be mobile devices that are configured to provide network access regardless of location.

DETAILED DESCRIPTION OF EXAMPLE EMBODIMENTS

The following detailed description refers to the accompanying drawings. The same reference numbers in different drawings may identify the same or similar elements.

Embodiments described herein provide for a mobile gateway that provides access to one or more networks, such as the Internet, based on a variety of configurable parameters, constraints, etc. As such, a user associated with the mobile gateway may be able to control where, when, by whom, etc. access to the one or more networks is provided by the mobile gateway of some embodiments. This level of configurability may provide enhanced usability as compared to "fixed" devices that are configured to provide network access at one location, and further as compared to "hotspot" devices that are configured to provide network access regardless of location. Further, as discussed below, parameters in addition to, or in lieu of location (e.g., time, identity of users and/or devices receiving network access via the mobile gateway, maximum quantity of users and/or devices receiving network access via the mobile gateway, and/or other parameters) may be used to configure the access provided by a mobile gateway to one or more User Equipment ("UEs"), such as mobile phones, tablets, laptops, etc. In this manner, the mobile gateway of some embodiments may offer more granular network access parameters than "fixed" network access devices or "hotspot" network access devices.

Figure 1:
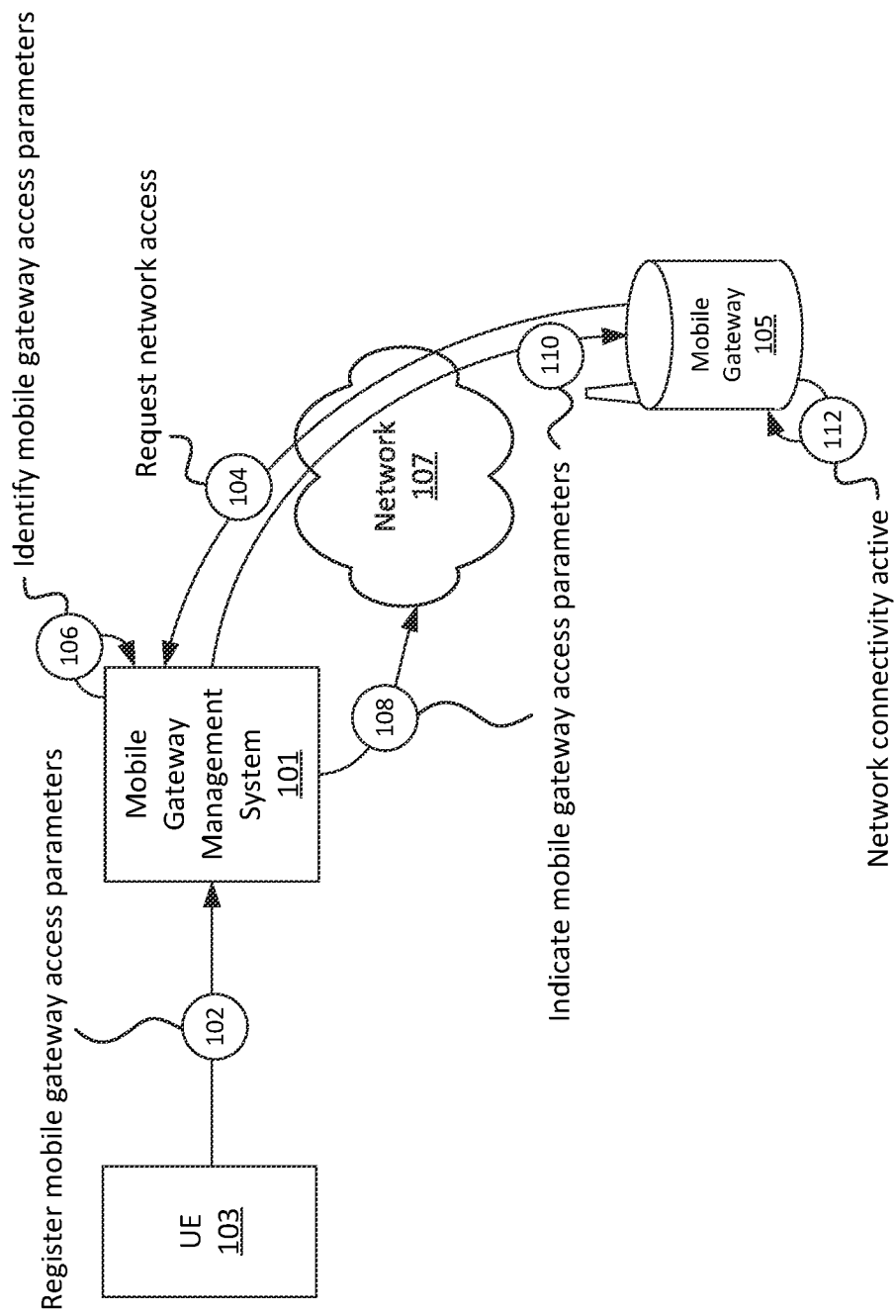
FIGS. 1 and 2 illustrate an example overview of one or more embodiments described herein.

As shown in FIG. 1, for example, Mobile Gateway Management System ("MGMS") 101 may receive (at 102) a set of mobile gateway access parameters from UE 103. For example, MGMS 101 may be associated with a web portal, a web site, an application programming interface ("API"), and/or other suitable communication pathway via which UE 103 and MGMS 101 may communicate, such as to receive (at 102) the mobile gateway access parameters from UE 103.

The set of mobile gateway access parameters may be associated with a particular mobile gateway 105. For example, MGMS 101 may receive, maintain, etc. access parameters for multiple mobile gateways 105, which may be associated with multiple users, user accounts, UEs 103, groups, organizations, etc. The mobile gateway access parameters received (at 102) from UE 103 may indicate a particular mobile gateway 105, a particular user account, an identifier associated with UE 103 (e.g., a Subscription Permanent Identifier ("SUPI"), a Globally Unique Temporary Identifier ("GUTI"), an Internet Protocol ("IP") address, etc.), and/or some other suitable identifier based on which MGMS 101 may identify that the access parameters are associated with a particular mobile gateway 105, out of a set of mobile gateways 105 for which MGMS 101 maintains access parameter information. In some embodiments, MGMS 101 and/or UE 103 may participate in an authentication process in order to verify that UE 103 is authorized to register and/or modify access parameters associated with mobile gateway 105.

As noted above, and as discussed in more detail below, the mobile gateway access parameters may indicate locations at which mobile gateway 105 is authorized to access one or more networks, such as network 107 (which may include the Internet, a core of a wireless network, and/or one or more other networks), and/or locations at which mobile gateway 105 is not authorized to access network 107. For example, a user associated with UE 103 and/or mobile gateway 105 may desire to use mobile gateway 105 at the user's home, workplace, and school. As another example, a user associated with UE 103 and/or mobile gateway 105 may be an administrator associated with an enterprise that provides mobile gateway 105 to an employee, and wishes to restrict usage of mobile gateway 105 to one or more facilities associated with the enterprise, the employee's home, one or more job sites, etc. Additionally, or alternatively, the mobile access parameters may indicate times at which mobile gateway 105 is authorized to access network 107, such as specific times of the day (e.g., 9:00 AM-5:00 PM or some other time range), days of the week (e.g., Monday-Friday or some other days of the week), and/or other temporal parameters.

In some embodiments, the mobile gateway access parameters may include composite rules, constraints, etc. For example, such composite rules, constraints, etc. may include logical operators, dependencies, conditions, or the like, such that dynamic and complex access parameters may be defined. For example, a particular set of access parameters may specify that if mobile gateway 105 is located at a first location, mobile gateway 105 should receive access to network 107 during a first set of times (e.g., 9:00 AM-5:00 PM), while if mobile gateway 105 is located at a second location, mobile gateway 105 should receive access to network 107 during a different second set of times (e.g., 3:00 PM-8:00 PM). Further examples of mobile gateway access parameters, including composite mobile gateway access parameters, are provided below.

At some point after the access parameters have been registered (at 102) mobile gateway 105 may request (at 104)

access to network 107. For example, mobile gateway 105 may include one or more network interfaces via which mobile gateway 105 is able to communicate with network 107. For example, mobile gateway 105 may include, and/or may be communicatively coupled to, a modem, a Network Interface Controller ("NIC"), an Optical Network Terminal ("ONT"), and/or some other suitable component via which mobile gateway 105 is able to communicate with network 107. Mobile gateway 105 may further communicate with MGMS 101 via network 107. For example, MGMS 101 and mobile gateway 105 may communicate via an API or some other suitable communication pathway. Further, MGMS 101 may communicate with one or more elements of network 107 that provide access to network 107, in order to indicate whether mobile gateway 105 should be granted access to network 107.

In some embodiments, MGMS 101 may receive the network access request associated with mobile gateway 105, and may identify (at 106) mobile gateway access parameters associated with mobile gateway 105. For example, the network access request may include an identifier of mobile gateway 105, such as a Media Access Control ("MAC") address, a SUPI, a GUTI, and/or some other suitable identifier based on which MGMS 101 may identify access parameters associated with mobile gateway 105. In some embodiments, network 107 may provide temporary or provisional network access to mobile gateway 105, so that mobile gateway 105 may communicate with MGMS 101 and/or one or more elements of network 107 to determine whether the request (at 104) for network access should be granted.

The network access request (at 104) may further include attributes, parameters, etc. associated with mobile gateway 105, and/or MGMS 101 may determine such attributes, parameters, etc. in some other way. For example, MGMS 101 may determine a location of mobile gateway 105 based on information provided by mobile gateway 105 as part of the request, and/or as determined by one or more elements of network 107 (e.g., where network 107 includes one or more devices or systems that determine the location of mobile gateway 105). In some embodiments, as discussed below, MGMS 101 may identify a time at which access has been requested, one or more accounts associated with mobile gateway 105, and/or other attributes and/or parameters.

MGMS 101 may further identify (at 106) a set of mobile gateway access parameters associated with mobile gateway 105. For example, such parameters may include and/or may be based on the parameters provided (at 102) by UE 103 during a registration process. MGMS 101 may further determine whether to grant access to mobile gateway 105 based on the identified mobile gateway access parameters and one or more attributes, parameters, etc. associated with mobile gateway 105 (e.g., location, time, etc.). For example, MGMS 101 may determine whether mobile gateway 105 is in an authorized location (e.g., as indicated by the mobile gateway access parameters), is requesting access at an authorized time, etc.

In this example, assume that mobile gateway 105 is authorized to access network 107 based on its attributes, parameters, etc. such as location, time, or other attributes or parameters. As such, MGMS 101 may indicate (at 108 and/or 110) that mobile gateway 105 is authorized to access network 107. Once such indication is received, mobile gateway 105 may provide (at 112) connectivity to one or more UEs, which may connect to mobile gateway 105 and may further communicate with network 107 via mobile gateway 105.

For example, MGMS 101 may provide (at 108) an indication to one or more elements of network 107, such as a Unified Data Management function ("UDM"), a Home Subscriber Server ("HSS"), and/or some other suitable device or system that mobile gateway 105 is authorized to access network 107. In some embodiments, MGMS 101 may further provide (at 108) additional parameters, constraints, etc. associated with the access (e.g., based on the mobile gateway access parameters associated with mobile gateway 105). For example, MGMS 101 may indicate a specific duration of time for which network access should be granted to mobile gateway 105 (e.g., one hour, one day, etc.), times of the day for which network access should be granted to mobile gateway 105 (e.g., 9:00 AM-5:00 PM), locations at which network access should be granted to mobile gateway 105, or the like. As such, network 107 may enforce such parameters, constraints, etc. by granting access when conditions indicated by the parameters, constraints, etc. are met, and by revoking or denying access when conditions indicated by the parameters, constraints, etc. are not met.

Additionally, or alternatively, MGMS 101 may provide (at 110) an indication of the mobile gateway access parameters to mobile gateway 105. In this manner, in addition to, or in lieu of, network 107 enforcing the parameters, constraints, etc. associated with the provided network access, mobile gateway 105 may enforce or otherwise implement the parameters, constraints, etc. associated with the network access. For example, mobile gateway 105 may disconnect from network 107 when mobile gateway 105 is moved out of an authorized location, when an authorized time period for the access has expired, etc. In some embodiments, the mobile gateway access parameters (provided at 108 and/or 110) may include an authorized list of UEs, based on which network 107 and/or mobile gateway 105, respectively, may grant or deny network access to UEs that access, or attempt to access, network 107 via mobile gateway 105.

Figure 2:
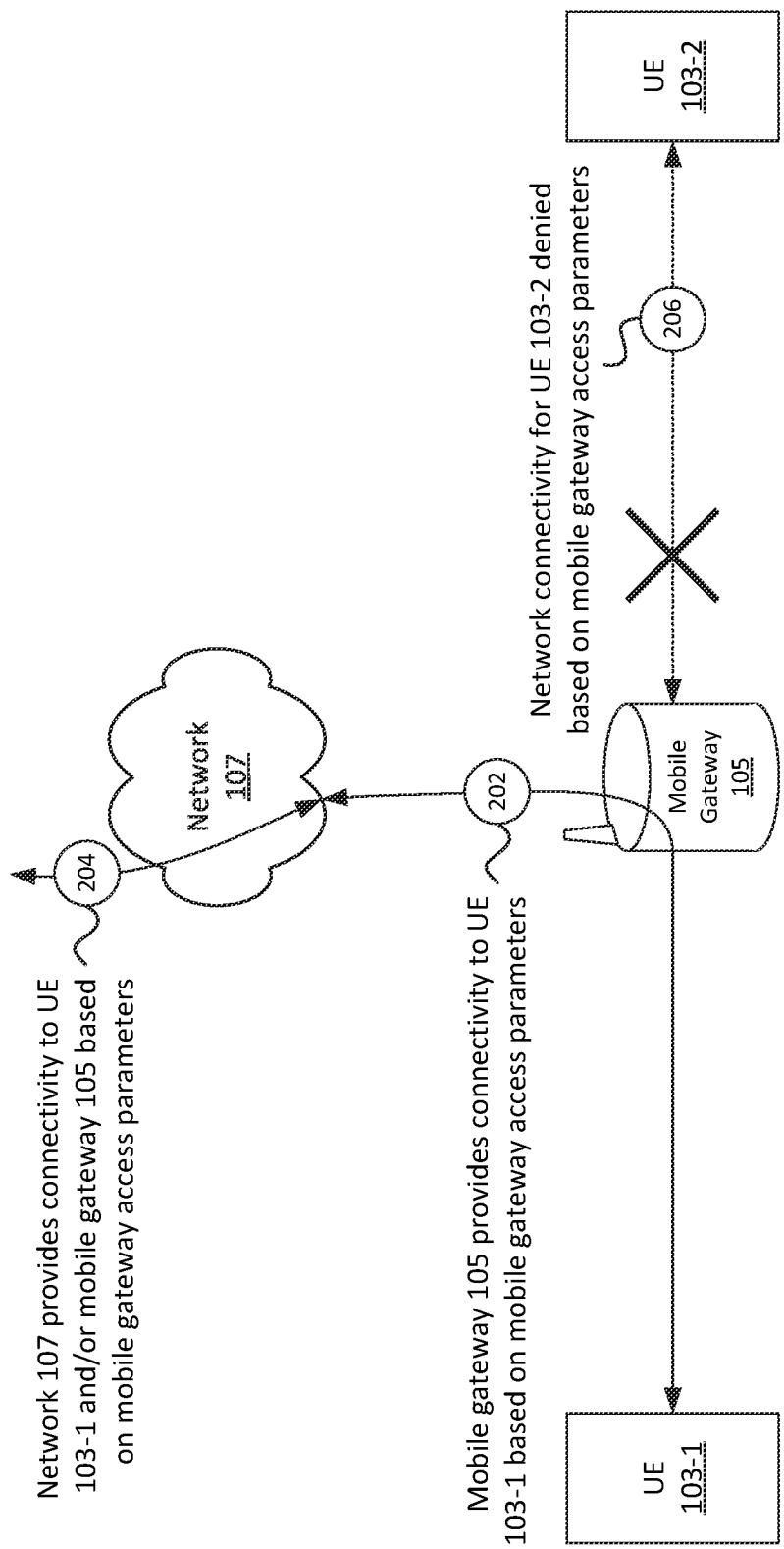

For example, as shown in FIG. 2, a first UE 103-1 may be authorized to access network 107 via mobile gateway 105, which may be indicated in mobile gateway access parameters associated with mobile gateway 105. As such, mobile gateway 105 may provide (at 202) connectivity to UE 103-1. Such connectivity may include providing an interface, such as a wired interface or a wireless interface, between UE 103-1 and network 107. Additionally, or alternatively, network 107 may provide (at 204) connectivity to UE 103-1 and/or mobile gateway 105 based on mobile gateway access parameters associated with mobile gateway 105. For example, network 107 may determine that mobile gateway 105 is authorized to access network 107, and/or may determine that UE 103-1 is authorized to access network 107 via mobile gateway 105. In some embodiments, for instance, one or more elements of network 107 may determine that UE 103-1 has been registered as being associated with mobile gateway 105, and therefore UE 103-1 should be granted access to network 107 when communicating with network 107 via mobile gateway 105.

On the other hand, mobile gateway 105 may deny (at 206) network connectivity for a second UE 103-2. UE 103-2 may, for example, not be authorized to access mobile gateway 105. UE 103-2 may not have been registered as being associated with mobile gateway 105, may have been registered as being a "blocked" or "blacklisted" device with respect to mobile gateway 105, and/or may otherwise not be permitted to access network 107 via mobile gateway 105. In some embodiments, mobile gateway 105 may deny (at 206) network connectivity to UE 103-2 based on some other parameter, such as a parameter indicating a maximum quantity of UEs 103 that may be concurrently connected to mobile gateway 105 at any given time. That is, mobile gateway 105 may be connected to a threshold quantity of UEs 103 prior to receiving a request from UE 103-2 to access network 107, and may deny (at 206) the request from UE 103-2, as allowing the request would exceed the threshold maximum quantity of concurrently connected UEs 103.

Figure 3:
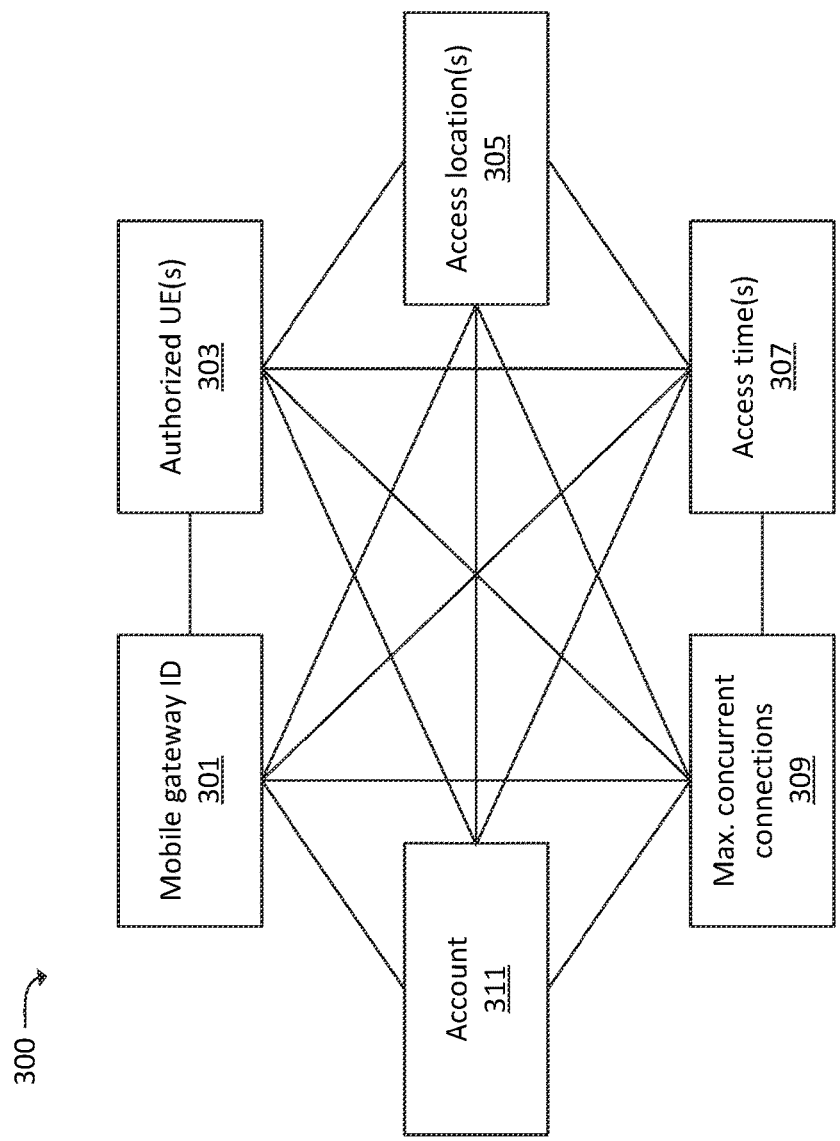
FIGS. 3 and 4 illustrate example mobile gateway access parameters, in accordance with one or more embodiments described herein.

FIG. 3 illustrates an example set of mobile gateway access parameters 300 that may be used to specify conditions, thresholds, etc. based on which a given mobile gateway 105 may be provided access to network 107, and/or based on which one or more UEs 103 may be provided access to network 107 via mobile gateway 105. As shown, mobile gateway access parameters 300 may include one or more mobile gateway identifiers ("IDs") 301, authorized UE information 303, access location information 305, access time information 307, maximum concurrent connection information 309, and account information 311. In some embodiments, mobile gateway access parameters 300 may include additional, fewer, different, and/or differently arranged information.

As discussed above, mobile gateway access parameters 300 may be generated or modified based on a registration procedure, in which some or all of the information associated with mobile gateway access parameters 300 may be indicated by one or more users. Additionally, or alternatively, some or all of mobile gateway access parameters 300 may be generated or modified automatically, such as by one or more artificial intelligence/machine learning ("AUML") techniques or other suitable automated techniques.

Mobile gateway ID information 301 may include one or more identifiers, such as a MAC address, SUPI, GUTI, etc. associated with a particular mobile gateway 105. In some embodiments, mobile gateway ID information 301 may include identifiers associated with multiple mobile gateways 105. For example, multiple mobile gateways 105 may be associated with one or more of the same other attributes 303-311, and/or multiple mobile gateways 105 may be within the same group of mobile gateways 105. When identifying parameters 300 associated with a given mobile gateway 105, MGMS 101 may identify a particular set of parameters 300, out of a group of sets of parameters 300, that includes matching mobile gateway ID information 301 for the given mobile gateway 105.

Authorized UE information 303 may include identifiers, such as SUPIs, GUTIs, International Mobile Station Equipment Identity ("IMEI") values, International Mobile Subscriber Identity ("IMSI") values, or the like regarding UEs 103 that are authorized to access network 107 via one or more mobile gateways 105 indicated by mobile gateway ID information 301.

Access location information 305 may indicate one or more locations at which one or more mobile gateways 105, indicated by mobile gateway ID information 301, are authorized to access network 107. Access location information 305 may specify latitude and longitude coordinates, tracking areas ("TAs") of a wireless network, physical addresses, Global Positioning System ("GPS") coordinates, and/or other suitable indications of geographical location.

Access time information 307 may indicate one or more times at which one or more mobile gateways 105, indicated by mobile gateway ID information 301, are authorized to access network 107. For example, as noted above, access time information 307 may indicate specific times of the day, days of the week, etc. that mobile gateway 105 is authorized to access network 107. Additionally, or alternatively, access time information 307 may indicate a particular duration of time that mobile gateway 105 is authorized to access network 107 (e.g., 2 hours per 24-hour period, 4 hours per access request, etc.), and/or a particular duration of time that one or more UEs 103 are authorized to access network 107 via mobile gateway 105.

Maximum concurrent connection information 309 may indicate a maximum quantity of UEs 103 that may access network 107 via mobile gateway 105 at any given time. For example, as similarly discussed above, maximum concurrent connection information 309 may indicate that if a threshold quantity of UEs 103 are connected to mobile gateway 105 (e.g., are accessing network 107 via mobile gateway 105) at the same time, additional UEs 103 are not authorized to connect to mobile gateway 105. Additionally, or alternatively, maximum concurrent connection information 309 may indicate a maximum threshold quantity of mobile gateways 105 that are authorized to access network 107 at the same time, in situations where mobile gateway access parameters 300 is associated with multiple mobile gateways 105. For example, an organization may provide 100 mobile gateways 105 to its employees, but only 50 of these mobile gateways 105 may be authorized to access network 107 at any given time. In some embodiments, in situations where the maximum quantity of mobile gateways 105 of a group of mobile gateways 105 are accessing network 107, a user or UE 103 attempting to access network 107 via one of the "excess" mobile gateways 105 may be provided an opportunity, by MGMS 101 and/or one or more elements of network 107, to obtain authorization to access network 107 in some other way, such as by purchasing access time and/or bandwidth, by logging into a different account, etc.

Account information 311 may indicate one or more accounts, associated with network 107, that may be used to access network 107 by mobile gateway 105. For example, mobile gateway 105 may be associated with multiple accounts, where different accounts may be active based on one or more other parameters, such as location, time, etc. For example, an organization may provide mobile gateway 105 to an employee and may indicate that access to network 107 is associated with a particular account associated with the organization during business hours and/or at a premises associated with the organization (e.g., an office, a facility, a jobsite, etc.), and that access to network 107, via mobile gateway 105, is associated with a different account, such as a personal account of the employee, at other times and/or locations.

Figure 4:
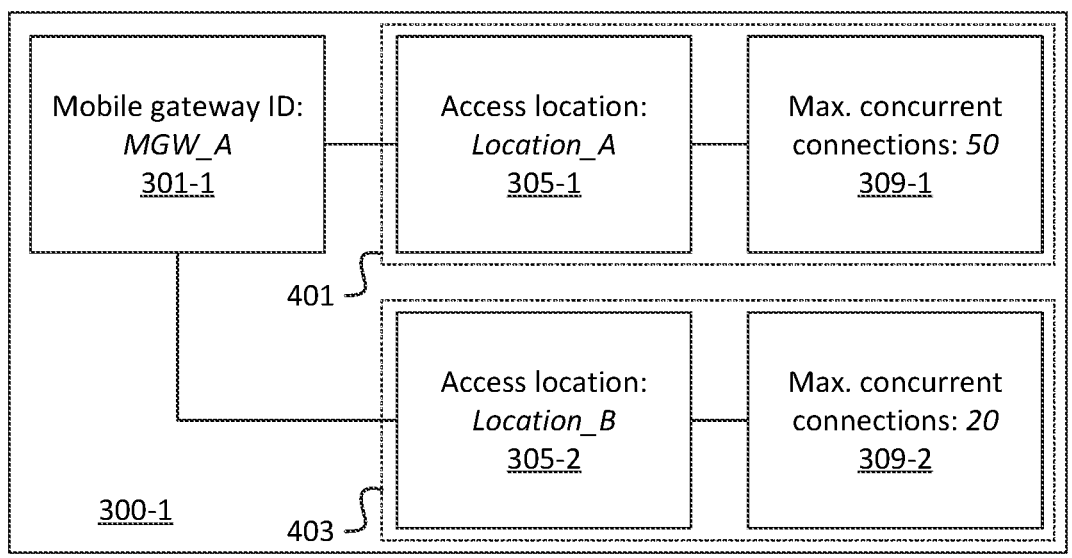
Figure 4:
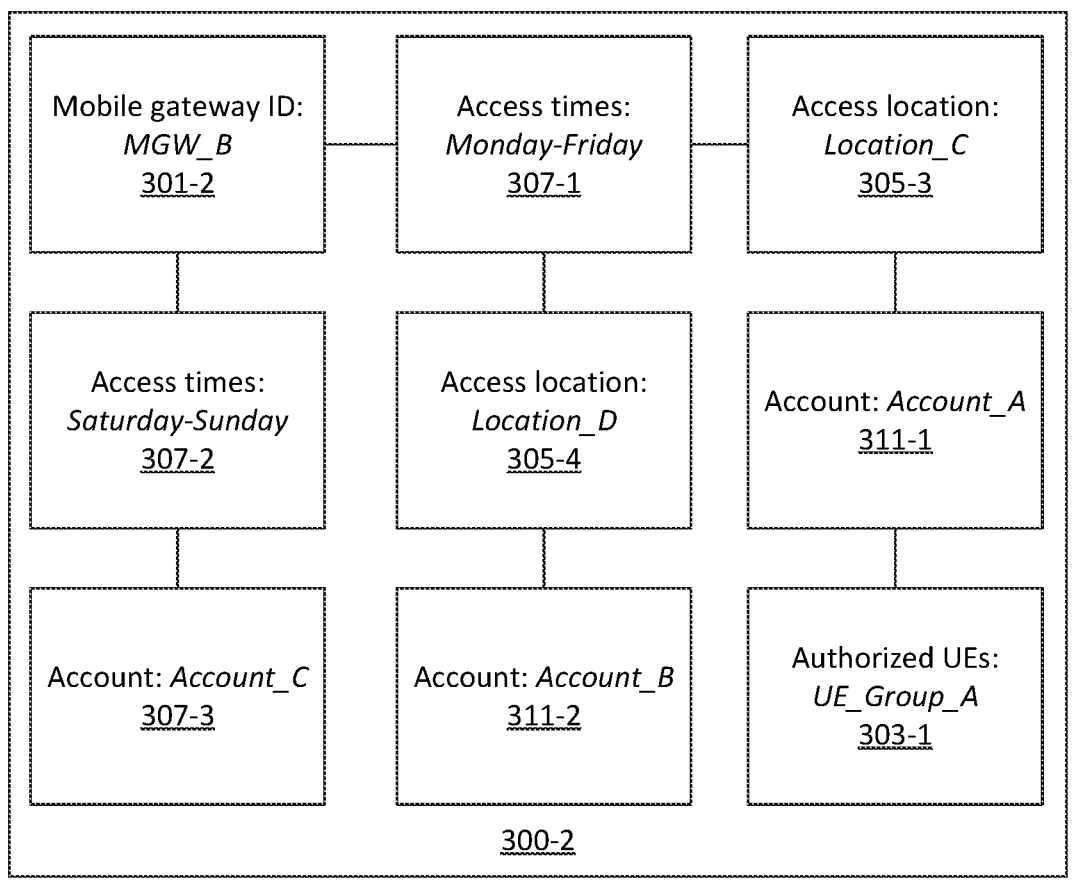

As noted above, and as denoted by the connections in FIG. 3 between parameters 301-311, mobile gateway access parameters 300 may include logical operators, rules, functions, conditions, etc. that involve multiple ones of parameters 301-311. For example, as shown in FIG. 4, a first instance of mobile gateway access parameters 300-1 may be associated with a first mobile gateway 105. As such, a first instance of mobile gateway ID information 301-1 may include an identifier of the first mobile gateway 105 (referred to here as "MGW_A"). In some embodiments, mobile gateway ID information 301-1 may indicate a single mobile gateway 105 or a group of mobile gateways 105. Additionally, or alternatively, mobile gateway access parameters 300-1 may include multiple instances of mobile gateway ID information 301, indicating multiple mobile gateways 105 and/or groups of mobile gateways 105.

Mobile gateway access parameters 300-1 may include two different sets of conditions, actions, and/or access parameters associated with the particular mobile gateway 105 or mobile gateways 105 indicated by mobile gateway ID information 301-1. The sets of conditions, actions, and/or access parameters may be represented as "chains" of parameters, such as a first parameter chain 401 that includes first access location information 305-1 and first maximum concurrent connection information 309-1. A second parameter chain 403 may include second access location information 305-2 and second maximum concurrent connection information 309-2.

A parameter "chain" may include or refer to a set of conditions, as well as actions or parameters that apply when the set of conditions is satisfied. In some embodiments, one or more parameters (e.g., parameters 301-311 and/or other parameters) may be used to specify such conditions and/or actions. For example, parameter chain 401 may include a condition specifying an access location of "Location_A" (e.g., a first instance of location information 305-1), and an action and/or parameter (e.g., a first instance of maximum concurrent connection information 309-1) specifying that a maximum quantity of concurrent connections for a given mobile gateway 105 (e.g., a given mobile gateway 105 that matches the mobile gateway ID specified by mobile gateway ID information 301-1) is 50. As further shown, parameter chains 403 may include a condition specifying an access location of "Location_B" (e.g., a second instance of location information 305-2), and an action and/or parameter (e.g., a second instance of maximum concurrent connection information 309-2) specifying that a maximum quantity of concurrent connections for a given mobile gateway 105 (e.g., a given mobile gateway 105 that matches the mobile gateway ID specified by mobile gateway ID information 301-1) is 20. Thus, mobile gateway access parameters 300-1 (e.g., parameter chains 401 and 403) may be used for a mobile gateway 105 that is authorized to provide different maximum quantities of connections in different locations.

As further shown, a second instance of mobile gateway access parameters 300-2 may include three sets of conditions and/or actions (e.g., "chains"). In this example, the sets of conditions and/or actions may apply to one or more mobile gateways 105 that match identifying information identified in a second instance of mobile gateway ID information 301-2 (referred to herein as "MGW_B"). Mobile gateway access parameters 300-2, may further be associated with a first instance of access time information 307-1, indicating that access times of Monday through Friday. This condition may further be associated with multiple different conditions, such as a condition specified by access location information 305-3 (e.g., "Location_C") and a condition specified by access location information 305-4 (e.g., "Location_D"). Thus, during Monday through Friday, mobile gateways 105 (which also match mobile gateway ID information 301-2) that are located at Location_C are associated with access parameters associated with account information 311-1 (e.g., "Account_A") and authorized UE information 303-1 (e.g., "UE_Group_A"). That is, when these conditions are met, mobile gateway 105 may be associated with Account_A (e.g., may register with and/or connect to network 107 using Account_A), and may further implement access control such that only UEs 103 of the authorized UE_Group_A are provided network access via mobile gateway 105.

On the other hand, during Monday through Friday, mobile gateways 105 (which also match mobile gateway ID information 301-2) that are located at Location_D are associated with access parameters associated with account information 311-2 (e.g., "Account_B"). That is, when these conditions are met, mobile gateway 105 may be associated with Account_B (e.g., may register with and/or connect to network 107 using Account_B). Further, the access controls associated with the conditions specified by mobile gateway ID information 301-1 (e.g., when mobile gateway 105 is at, or within a threshold proximity of, Location_C) may not apply when mobile gateway 105 is located at, or within a threshold proximity of, Location_D. At other times (e.g., on Saturdays and Sundays, as specified by access time information 307-2), mobile gateway 105 may be associated with "Account_C," as indicated by access time information 307-3. In this manner, the same mobile gateway 105 (or group of mobile gateways 105) may be associated with different temporal and/or location conditions. Further, as demonstrated, different types or amounts of actions and/or access parameters may apply when different conditions are met.

While FIG. 4 provides an example of how parameters 301-311 (and/or other parameters) may be used to specify conditions, as well as actions and/or parameters that apply when such conditions are met, some embodiments may specify such conditions, actions, and/or parameters in some other suitable manner. As such, relatively complex correlations and/or logic may be used to specify relationships, conditions, etc. between different parameters 301-311, in order to generate complex rules, actions, etc. to specify access parameters for mobile gateways 105.

Figure 5:
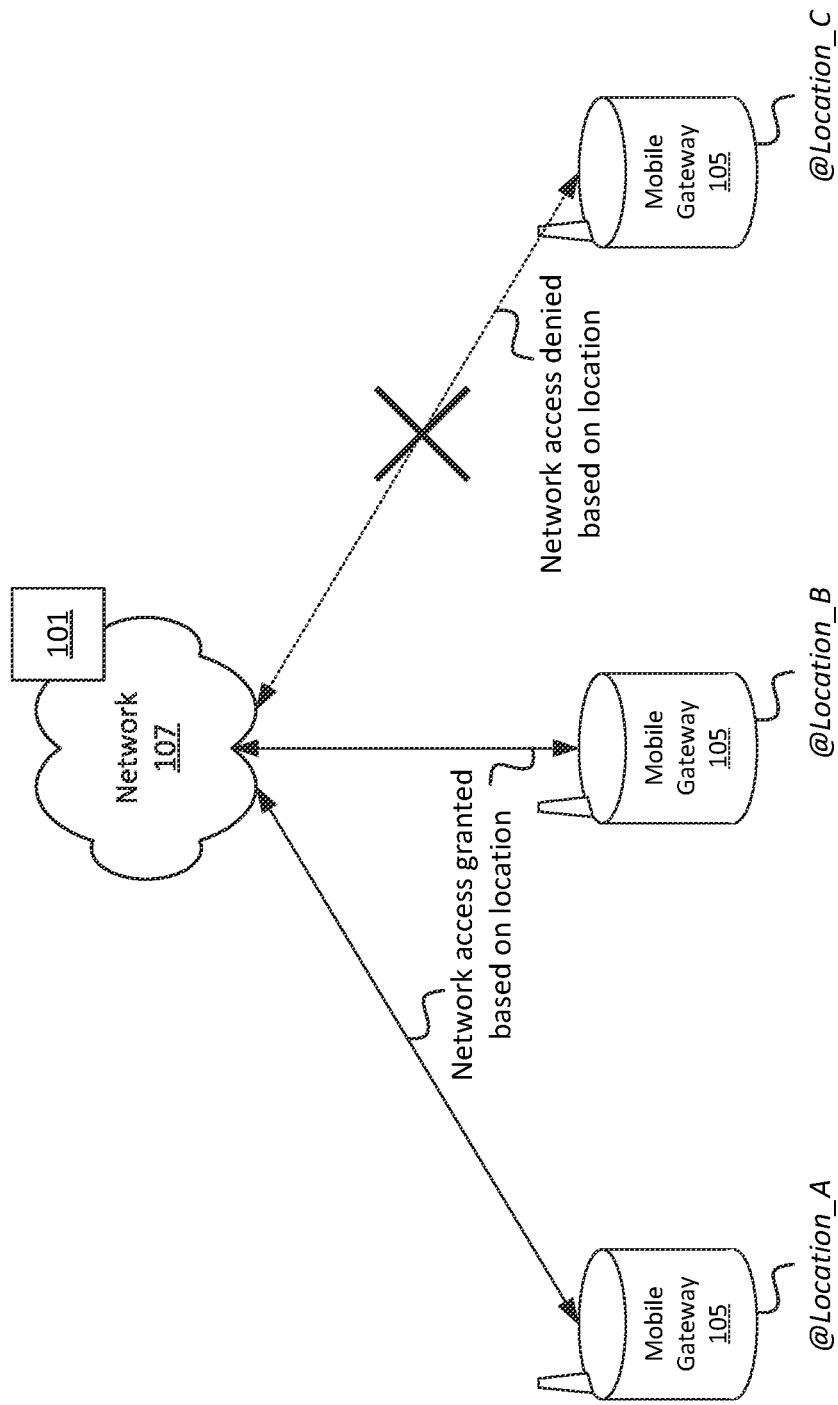
FIGS. 5-8 illustrate example scenarios of different types of network access provided to one or more mobile gateways, in accordance with one or more embodiments described herein.

FIGS. 5-8 illustrate example scenarios that may occur based on various sets of mobile gateway access parameters 300 (e.g., based on which different sets of conditions, actions, parameters, etc. may apply in different situations). For example, as shown in FIG. 5, a particular mobile gateway 105 may be located at different locations, and may be granted or denied access to network 107 based on location. For example, network 107 (e.g., one or more network elements of network 107, which may include and/or may be communicatively coupled to MGMS 101) may grant access to mobile gateway 105 when mobile gateway 105 is located at (or within a threshold proximity of) Location_A or Location_B, and may deny access to mobile gateway 105 when mobile gateway 105 is located at (or within a threshold proximity of) Location_C. Additionally, or alternatively, network 107 may deny access to mobile gateway 105 when mobile gateway 105 is not located at an authorized location, such as Location_A or Location_B. Such a scenario may occur when, for example, mobile gateway 105 is provided to an employee by an organization, and use of mobile gateway 105 is authorized at particular locations such as an office or a facility, and is not authorized outside of such locations. Additionally, or alternatively, the organization may specify particular locations at which mobile gateway 105 is not authorized to access network 107, such as in secure locations, near airports, etc.

Figure 6:
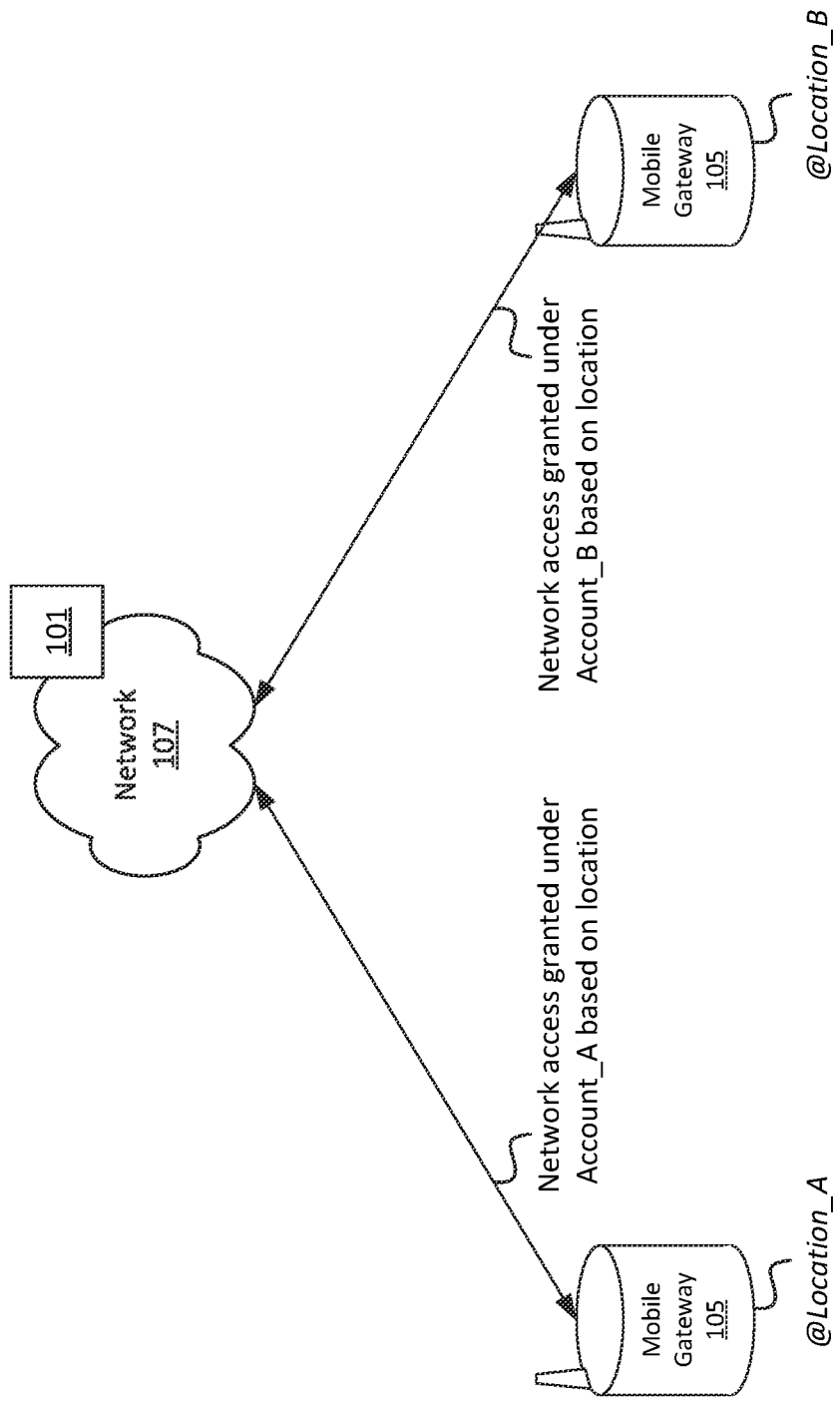

As shown in FIG. 6, a particular mobile gateway 105 may be granted different types or levels of access to network 107 based on location and/or other conditions. For example, when mobile gateway 105 is located at Location_A, network 107 and/or MGMS 101 may grant network access to mobile gateway 105 under a first account ("Account_A"). For example, mobile gateway 105 may utilize a set of authentication credentials, identifiers, etc. associated with Account_A (e.g., may refrain from using a different set of authentication credentials, identifiers, etc. associated with a different account) to request access to network 107. Additionally, or alternatively, MGMS 101 and/or network 107 may identify the location of mobile gateway 105 and one or more identifiers of mobile gateway 105 (e.g., MAC address, SUPI, GUTI, etc.), and may identify that the access is associated with Account_A based on the location and identifier(s) of mobile gateway 105. Thus, when mobile gateway 105 accesses network 107 under Account_A, one or more elements of network 107 (e.g., a charging function, a usage tracking function, a network slice selection function, one or more routing elements, etc.) may utilize one or more parameters that are associated with Account_A in particular (e.g., differentiated from one or more other accounts) when mobile gateway 105 accesses network 107. For example, an amount of usage, bandwidth, etc. associated with the access may be annotated or identified as being associated with Account_A. Additionally, or alternatively, one or more policies, rules, etc. associated with Account_A may be used when mobile gateway 105 accesses network 107. Such policies, rules, etc. may include Quality of Service ("QoS") parameters, content filtering, bandwidth and/or usage limits, virtual private networks ("VPNs"), etc.

As further shown in FIG. 6, when mobile gateway 105 is located at Location_B, network 107 may provide network access to mobile gateway 105 under Account_B. Thus, when mobile gateway 105 is in Location_A, mobile gateway 105 may receive access to network 107 under a first account, while when mobile gateway 105 is in Location_B, mobile gateway 105 may receive access to network 107 under a second account. Such a scenario may occur when, for example, mobile gateway 105 is provided to an employee by an organization, and network access is provided under an organizational account when mobile gateway 105 is located at a particular location such as an office or a facility, and network access is available under a personal account of the employee when the employee is not located at the particular location (and/or is located at another particular location).

Figure 7:
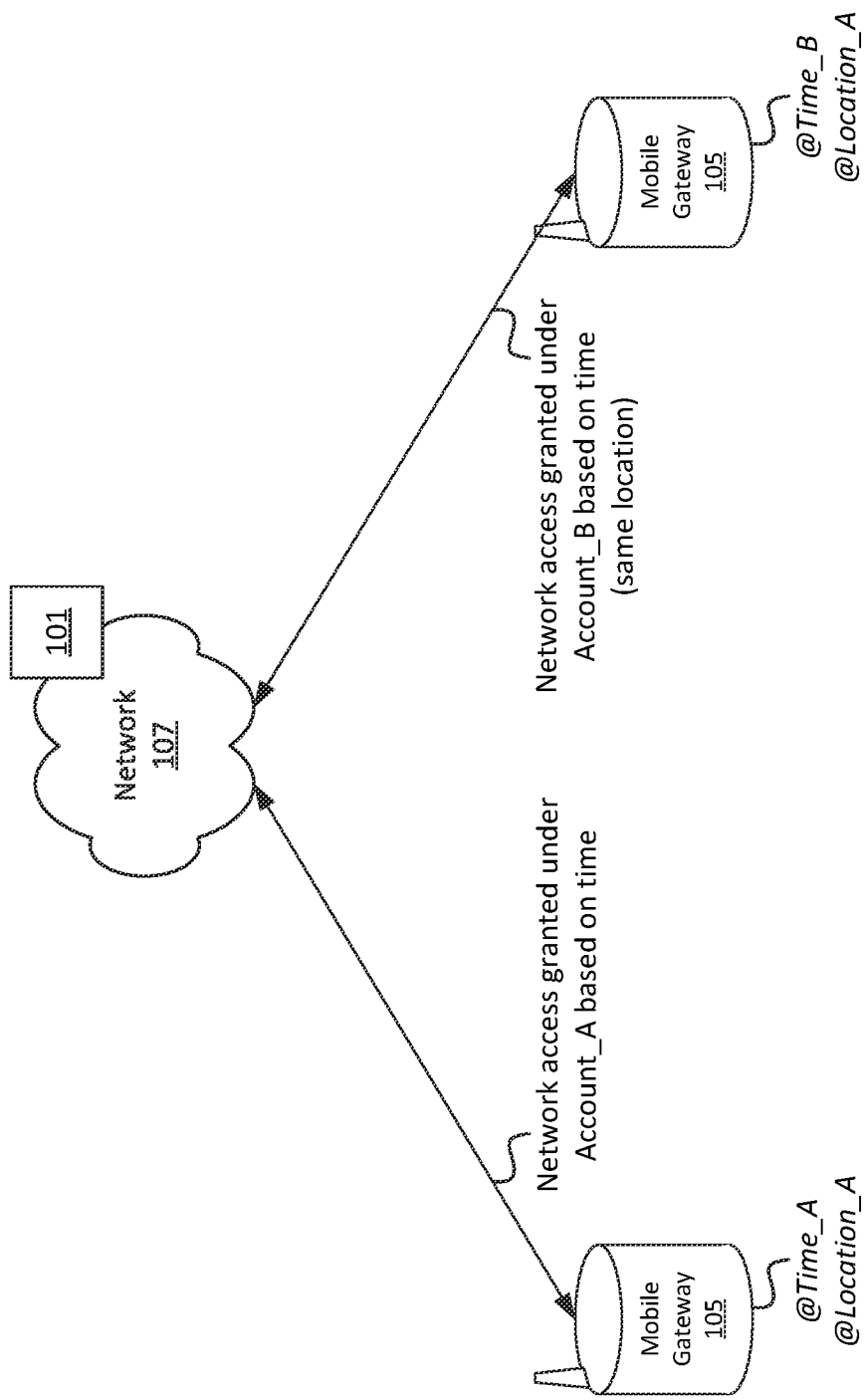

As shown in FIG. 7, temporal conditions may be used to define access parameters for a particular mobile gateway 105, even when mobile gateway 105 is located in the same location. For example, as shown, mobile gateway 105 may be at the same location (Location_A) at two different times (Time_A and Time_B). MGMS 101 and/or network 107 may grant access to mobile gateway 105 under Account_A at or during Time_A, and may grant access to mobile gateway 105 under Account_B at or during Time_B.

Figure 8:
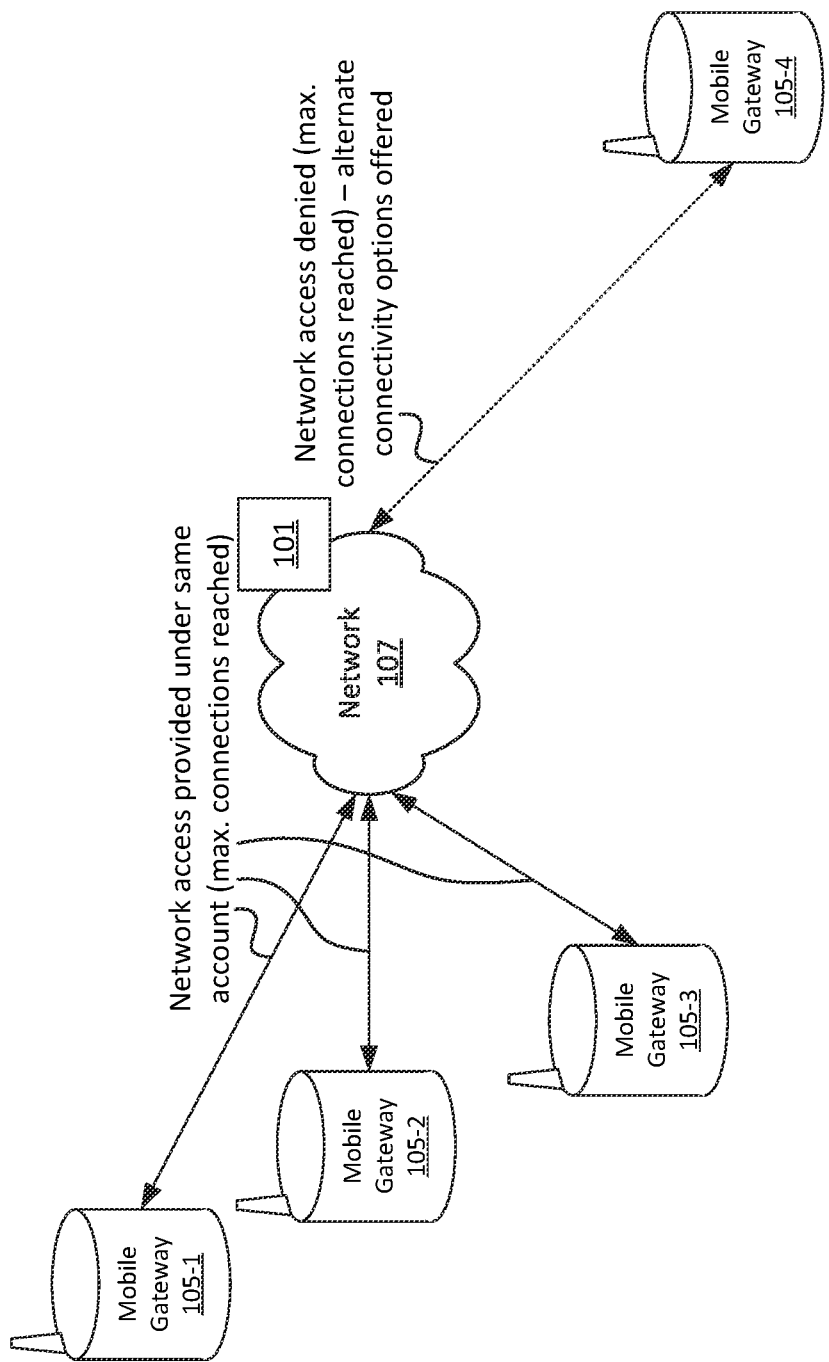

As shown in FIG. 8, multiple mobile gateways 105 may be associated with the same group, account, or pool of mobile gateways 105. For example, mobile gateways 105-1 through 105-4 may all be associated with the same account or set of accounts with respect to network 107. Further, this group of mobile gateways 105 may be associated with a parameter indicating that a maximum quantity of mobile gateways 105 that may concurrently access network 107 at a given time is three. Thus, mobile gateways 105-1, 105-2, and 105-3 may be granted access to network 107 under this account, while mobile gateway 105-4 may be denied access to network 107 under the same account.

In some embodiments, MGMS 101 and/or network 107 may identify that mobile gateway 105-4 was denied access based on access parameters associated with mobile gateways 105-1 through mobile gateway 105-4, and may offer one or more alternate connectivity options. For example, MGMS 101 may offer access to network 107 for mobile gateway 105-4 under a different account. For example, a user of mobile gateway 105-4 may be provided with an interface, a web portal, etc. to register mobile gateway 105-4 with an account (e.g., a temporary access account), and/or to log in to an existing account via which mobile gateway 105-4 may receive network access.

Figure 9:
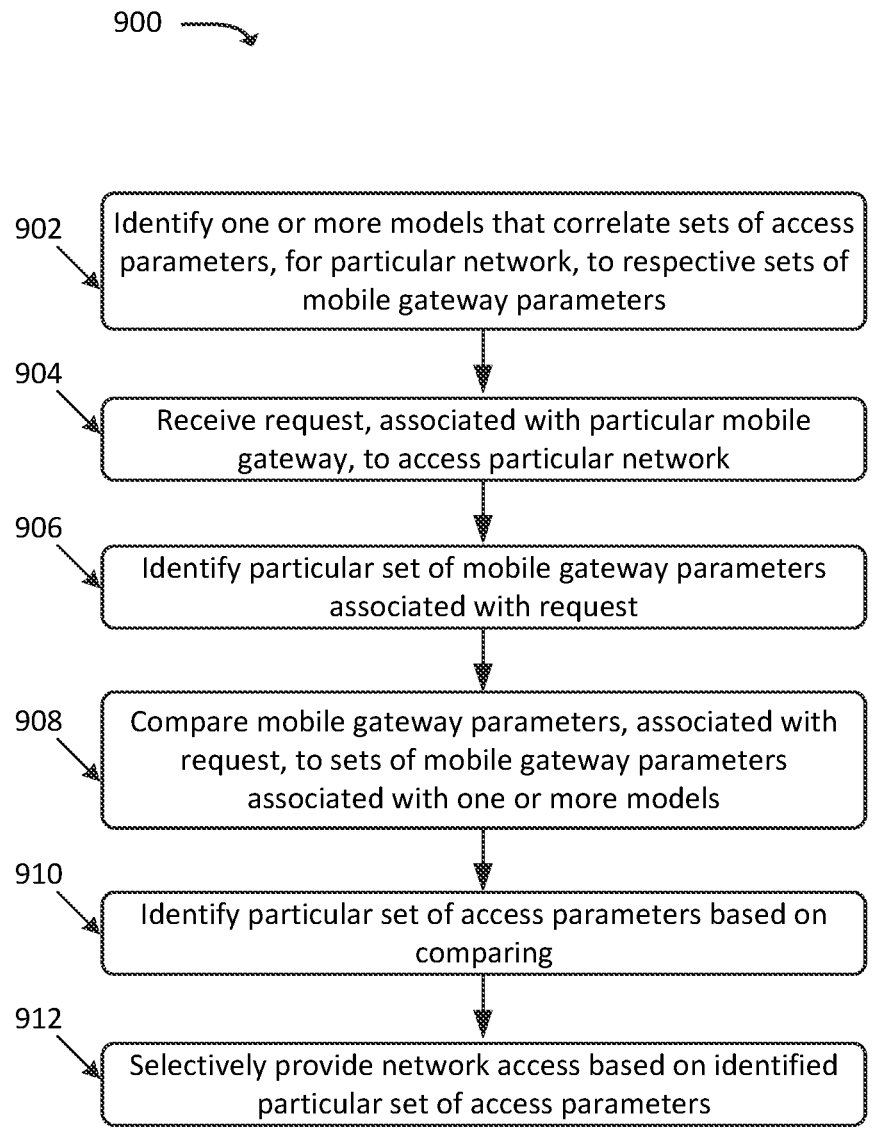
FIG. 9 illustrates an example process for selectively providing network access to a mobile gateway, in accordance with some embodiments.

FIG. 9 illustrates an example process 900 for selectively providing network access, associated with a particular network 107, to one or more mobile gateways 105 (e.g., via which one or more UEs 103 may access network 107) based on access parameters and/or one or more parameters associated with the one or more mobile gateways 105. In some embodiments, some or all of process 900 may be performed by MGMS 101. In some embodiments, one or more other devices may perform some or all of process 900 concert with, and/or in lieu of MGMS 101, such as one or more network elements of network 107.

As shown, process 900 may include identifying (at 902) one or more models that correlate sets of access parameters, for network 107, to respective sets of mobile gateway parameters. For example, MGMS 101 may generate, modify, receive, etc. one or more models, sets of mobile gateway access parameters 300, etc. that include correlations between various parameters 301-311 and/or other parameters. For example, as discussed above, such parameters may include attributes or conditions, such as location-based conditions, temporal conditions, mobile gateway ID conditions (e.g., specifying particular mobile gateways 105 and/or groups of mobile gateways 105), or other conditions. Further, such parameters may include actions, access parameters, or the like, specifying whether network access should be granted and/or a manner in which such access should be granted, such as a particular network account with which certain access should be granted, a maximum concurrent quantity of connections associated with a given mobile gateway 105 or account, etc.

Process 900 may further include receiving (at 904) a request, associated with a particular mobile gateway 105, for access to network 107. For example, MGMS 101 and/or one or more elements of network 107 may receive a request indicating that a particular mobile gateway 105 is attempting to access network 107. As discussed above, such access may include accessing network 107 as a gateway device via which one or more UEs 103 may communicate with network 107. In some embodiments, "temporary" or "limited" access may be granted to mobile gateway 105 for the purposes of receiving the request and evaluating whether access should be granted to mobile gateway 105, such that one or more UEs 103 are able to communicate with network 107 via mobile gateway 105. In the absence of "full" or "unrestricted" access, requests for access to network 107, from UEs 103 via mobile gateway 105, may be denied by network 107.

Process 900 may additionally include identifying (at 906) a particular set of mobile gateway parameters associated with the request. For example, MGMS 101 may identify an identifier of mobile gateway 105, a location of mobile gateway 105, a current time, and/or other suitable attributes or parameters of mobile gateway 105 and/or of the request associated with mobile gateway 105.

Process 900 may also include comparing (at 908) the particular set of mobile gateway parameters, associated with the request, to the sets of mobile gateway parameters associated with the one or more models. For example, MGMS 101 may perform a similarity analysis, a pattern matching analysis, or other suitable analysis to identify a set of mobile gateway parameters, associated with the model, that match (e.g., with at least a threshold measure of similarity) the parameters of mobile gateway 105.

Process 900 may further include identifying (at 910) a particular set of access parameters, indicated in the model, based on the comparison. For example, MGMS 101 may identify access parameters such as location-based restrictions or access parameters, temporal restrictions or access parameters, account-based restrictions or access parameters, and/or other parameters based on which MGMS 101 may determine whether to grant network access to mobile gateway 105. Additionally, or alternatively, such access parameters may indicate a manner in which network access should be granted, such as a maximum quantity of concurrent UE connections to mobile gateway 105, a maximum quantity of mobile gateways 105 associated with a same account that may connect to network 107, a list of authorized UEs 103 that may communicate with network 107 via mobile gateway 105, etc.

Process 900 may additionally include selectively providing (at 912) network access to mobile gateway 105 based on the identified particular set of access parameters. For example, MGMS 101 may deny access to mobile gateway 105 when identifying that conditions specified in the access parameters are not met. In some situations, MGMS 101 may grant access to mobile gateway 105 when identifying that one or more conditions (or sets of conditions) specified in the access parameters are met. Further, when granting access, MGMS 101 may grant the access in accordance with one or more access parameters, such as by indicating a set of UEs 103 that are authorized to access network 107 via mobile gateway 105 (e.g., where mobile gateway 105 and/or network 107 enforce such UE-based restrictions), a maximum quantity of concurrent connections, etc.

Figure 10:
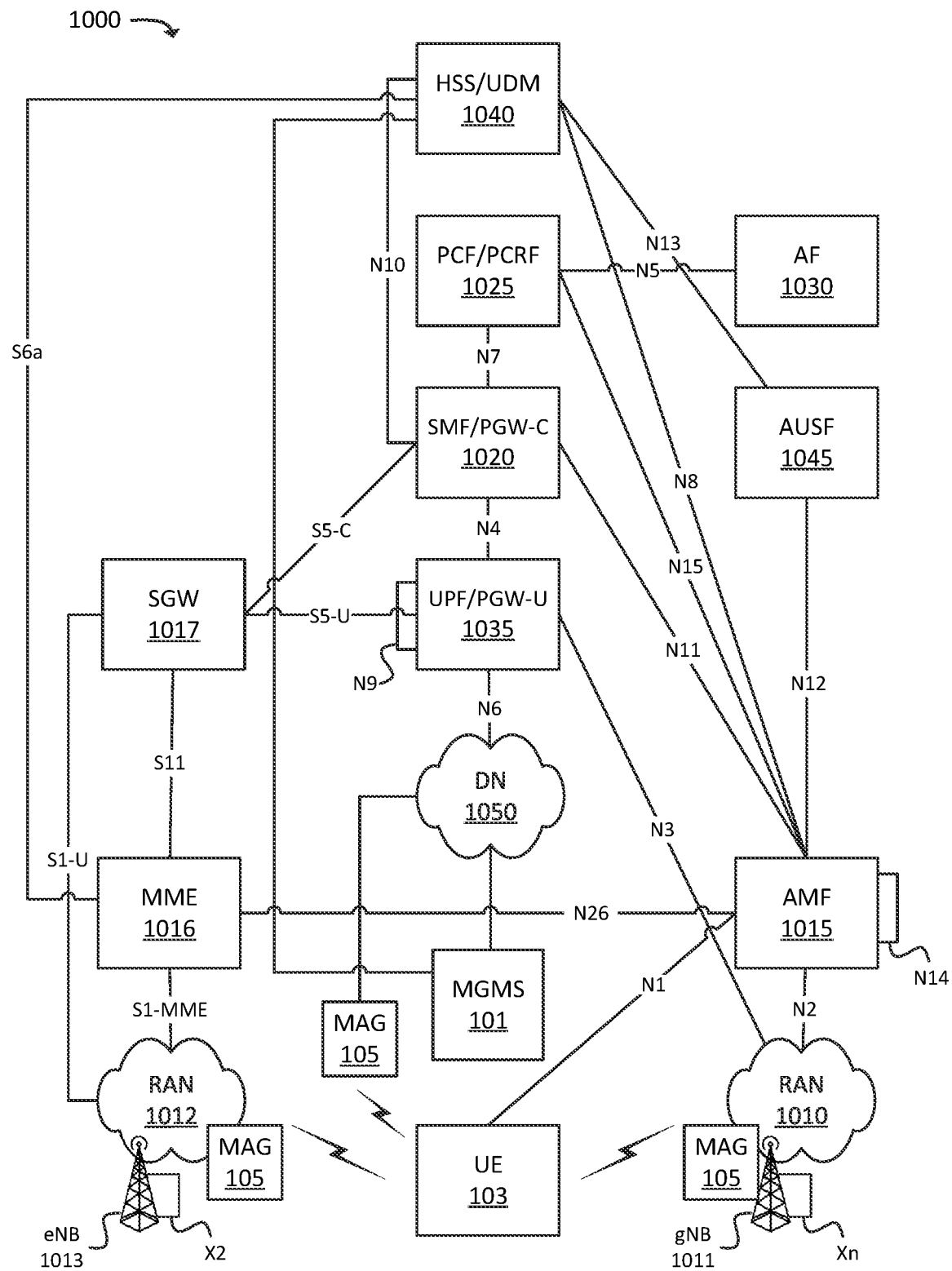
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 103, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, HSS/UDM 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as MGMS 101 and/or mobile gateway 105, which may perform one or more operations described above. In some embodiments, DN 1050 and/or one or more other elements of environment 1000 may include, may be implemented by, and/or may be communicatively coupled to network 107 discussed above.

The example shown in FIG. 10 illustrates one instance of each network component or function (e.g., one instance of SMF/PGW-C 1020, PCF/PCRF 1025, UPF/PGW-U 1035, HSS/UDM 1040, and/or AUSF 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or AUSF 1045, while another slice may include a second instance of SMF/PGW-C 1020, PCF/PCRF 1025, UPF/PGW-U 1035, HSS/UDM 1040, and/or AUSF 1045). The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 103 may include a computation and communication device, such as a wireless mobile communication device that is capable of communicating with RAN 1010, RAN 1012, mobile gateway 105, and/or DN 1050. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 103 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 103 may communicate with one or more other elements of environment 1000. UE 103 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 103 via the air interface, and may communicate the traffic to UPF/PGW-U 1035, and/or one or more other devices or networks. Similarly, RAN 1010 may receive traffic intended for UE 103 (e.g., from UPF/PGW-U 1035, AMF 1015, and/or one or more other devices or networks) and may communicate the traffic to UE 103 via the air interface.

RAN 1012 may be, or may include, a LTE RAN that includes one or more base stations (e.g., one or more eNBs 1013), via which UE 103 may communicate with one or more other elements of environment 1000. UE 103 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 103 via the air interface, and may communicate the traffic to UPF/PGW-U 1035, and/or one or more other devices or networks. Similarly, RAN 1010 may receive traffic intended for UE 103 (e.g., from UPF/PGW-U 1035, SGW 1017, and/or one or more other devices or networks) and may communicate the traffic to UE 103 via the air interface.

Mobile gateway 105 may provide connectivity between UE 103 and DN 1050. In some embodiments, mobile gateway 105 may be connected to DN 1050 via one or more suitable networks and/or systems, such as an Internet Service Provider ("ISP") backbone or other suitable communication pathway. In some embodiments, mobile gateway 105 may include modem, gateway, or other type of interface that is able to receive traffic from DN 1050 and provide such traffic to UE 103, and/or to receive traffic from UE 103 and provide such traffic to DN 1050. In some embodiments, mobile gateway 105 may be a component of, and/or may be communicatively coupled to, RAN 1012 and/or RAN 1010. In some embodiments, mobile gateway 105 may wirelessly communicate with RAN 1012 and/or RAN 1010, and/or may wirelessly communicate with one or more UEs 103. In some embodiments, mobile gateway 105 may communicate with RAN 1012 and/or RAN 1010 via one or more licensed frequency bands (e.g., which may be licensed from a government agency or other authoritative entity, such as a LTE RAT, a 5G RAT, etc.), and may communicate with UE 103 via one or more unlicensed frequency bands (e.g., a WiFi RAT or other unlicensed RAT).

AMF 1015 may include one or more devices, systems, Virtualized Network Functions ("VNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate the establishment of communication sessions on behalf of UE 103. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 103, from DN 1050, and may forward the user plane data toward UE 103 (e.g., via RAN 1010, SMF/PGW-C 1020, and/or one or more other devices). In some embodiments, multiple UPFs 1035 may be deployed (e.g., in different geographical locations), and the delivery of content to UE 103 may be coordinated via the N9 interface (e.g., as denoted in FIG. 10 by the line marked "N9" originating and terminating at UPF/PGW-U 1035). Similarly, UPF/PGW-U 1035 may receive traffic from UE 103 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 103.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 103 may communicate, through DN 1050, with data servers, other UEs 103, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 103 may communicate.

Figure 11:
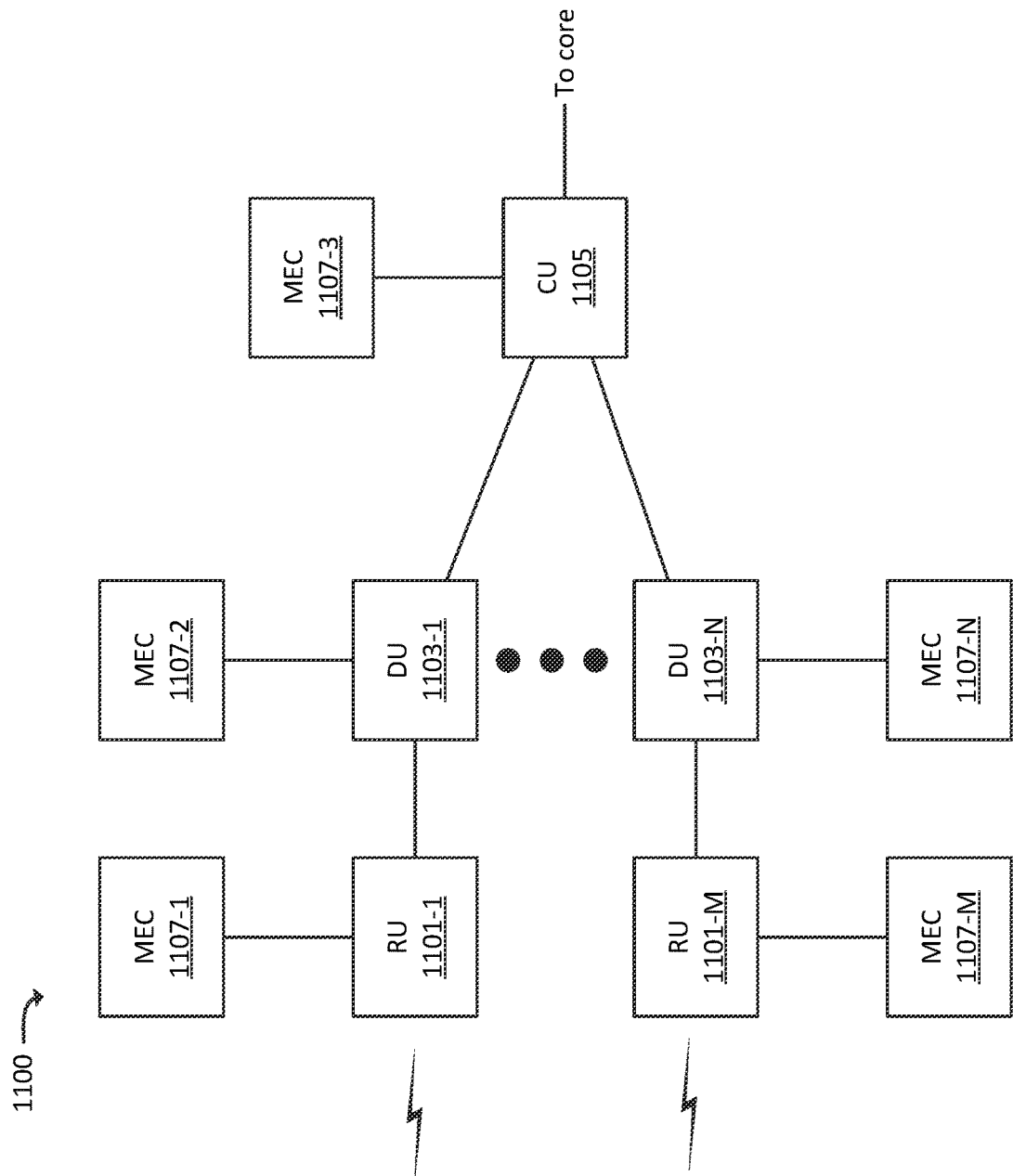
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 103 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 103, and may determine which DU(s) 1103 should receive the downlink traffic. DU 1103 may include one or more devices that transmit traffic between a core network (e.g., via CU 1105) and UE 103 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 103.

RU 1101 may include hardware circuitry (e.g., one or more RF transceivers, antennas, radios, and/or other suitable hardware) to communicate wirelessly (e.g., via an RF interface) with one or more UEs 103, one or more other DUs 1103 (e.g., via RUs 1101 associated with DUs 1103), and/or any other suitable type of device. In the uplink direction, RU 1101 may receive traffic from UE 103 and/or another DU 1103 via the RF interface and may provide the traffic to DU 1103. In the downlink direction, RU 1101 may receive traffic from DU 1103, and may provide the traffic to UE 103 and/or another DU 1103.

RUs 1101 may, in some embodiments, be communicatively coupled to one or more Multi-Access/Mobile Edge Computing ("MEC") devices, referred to sometimes herein simply as "MECs" 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 103, via a respective RU 1101.

For example, RU 1101-1 may route some traffic, from UE 103, to MEC 1107-1 instead of to a core network (e.g., via DU 1103 and CU 1105). MEC 1107-1 may process the traffic, perform one or more computations based on the received traffic, and may provide traffic to UE 103 via RU 1101-1. In this manner, ultra-low latency services may be provided to UE 103, as traffic does not need to traverse DU 1103, CU 1105, and an intervening backhaul network between DU network 1100 and the core network. In some embodiments, MEC 1107 may include, and/or may implement, some or all of the functionality described above with respect to MGMS 101.

Figure 12:
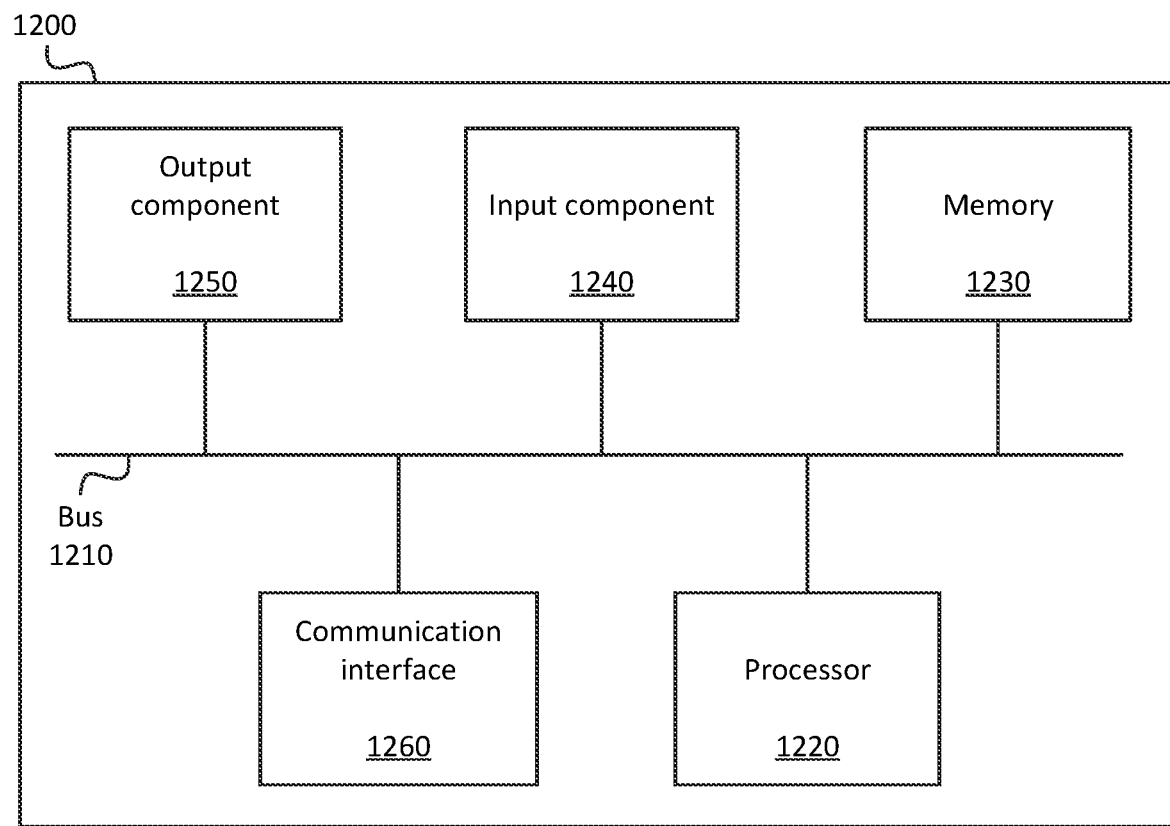
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify one or more models that correlate sets of access parameters, for access to a particular network, to one or more respective sets of mobile gateway parameters;
receive a request, associated with a particular mobile gateway, to access the particular network;
identify, based on the request, a particular set of mobile gateway parameters associated with the particular mobile gateway;
compare the particular set of mobile gateway parameters, associated with the particular mobile gateway, to the sets of mobile gateway parameters included in the one or more models;
identify a particular set of access parameters, associated with the one or more models, based on the comparing;
determine whether to provide access in response to the request based on the identified particular set of access parameters; and
selectively perform, based on the determining, one of:
deny the request for the particular mobile gateway to access the particular network, or
grant the request for the particular mobile gateway to access the particular network, wherein the mobile gateway provides connectivity between one or more User Equipment ("UEs") and the particular network when the request to access the particular network is granted.

2. The device of claim 1, wherein the particular mobile gateway communicates with the particular network via a first radio access technology ("RAT"), and wherein the particular mobile gateway communicates with the one or more UEs via a second RAT that is different from the first RAT.

3. The device of claim 2, wherein the first RAT includes one or more licensed wireless frequencies, and wherein the second RAT includes one or more unlicensed wireless frequencies.

4. The device of claim 1, wherein the particular set of access parameters indicate one or more UEs, wherein the particular mobile gateway determines that the one or more UEs are indicated in the particular set of mobile access parameters prior to providing connectivity between the one or more UEs and the particular network.

5. The device of claim 4, wherein the particular mobile gateway denies connectivity requests from UEs that are not indicated in the particular set of access parameters.

6. The device of claim 1, wherein the particular set of mobile gateway parameters indicate one or more locations, wherein the particular set of access parameters indicate a location of the particular mobile gateway, and wherein determining whether to provide access in response to the request based on the identified particular set of access parameters includes determining whether the location of the particular mobile gateway is within a threshold proximity of the one or more locations indicated in the set of mobile gateway parameters.

7. The device of claim 1, wherein the particular set of mobile gateway parameters include one or more network policies, wherein granting the request for the particular mobile gateway to access the particular network includes enforcing the one or more network policies.

8. A non-transitory computer-readable medium, storing a plurality of processor-executable instructions to:
identify one or more models that correlate sets of access parameters, for access to a particular network, to one or more respective sets of mobile gateway parameters;
receive a request, associated with a particular mobile gateway, to access the particular network;
identify, based on the request, a particular set of mobile gateway parameters associated with the particular mobile gateway;
compare the particular set of mobile gateway parameters, associated with the particular mobile gateway, to the sets of mobile gateway parameters included in the one or more models;
identify a particular set of access parameters, associated with the one or more models, based on the comparing;
determine whether to provide access in response to the request based on the identified particular set of access parameters; and
selectively perform, based on the determining, one of:
deny the request for the particular mobile gateway to access the particular network, or
grant the request for the particular mobile gateway to access the particular network, wherein the mobile gateway provides connectivity between one or more User Equipment ("UEs") and the particular network when the request to access the particular network is granted.

9. The non-transitory computer-readable medium of claim 8, wherein the particular mobile gateway communicates with the particular network via a first radio access technology ("RAT"), and wherein the particular mobile gateway communicates with the one or more UEs via a second RAT that is different from the first RAT.

10. The non-transitory computer-readable medium of claim 8, wherein the particular set of access parameters indicate one or more UEs, wherein the particular mobile gateway determines that the one or more UEs are indicated in the particular set of access parameters prior to providing connectivity between the one or more UEs and the particular network.

11. The non-transitory computer-readable medium of claim 8, wherein the particular mobile gateway denies connectivity requests from UEs that are not indicated in the particular set of access parameters.

12. The non-transitory computer-readable medium of claim 8, wherein the particular set of mobile gateway parameters indicate one or more locations, wherein the particular set of access parameters indicate a location of the particular mobile gateway, and wherein determining whether to provide access in response to the request based on the identified particular set of access parameters includes determining whether the location of the particular mobile gateway is within a threshold proximity of the one or more locations indicated in the set of mobile gateway parameters.

13. The non-transitory computer-readable medium of claim 8, wherein the particular set of mobile gateway parameters indicate a particular time associated with the request, wherein the particular set of access parameters indicate a set of times at which the mobile gateway is permitted to access the particular network, and wherein determining whether to provide access in response to the request based on the identified particular set of access parameters includes determining whether the particular time is within the set of times indicated in the set of mobile gateway parameters.

14. The non-transitory computer-readable medium of claim 8, wherein the particular set of mobile gateway parameters include one or more network policies, wherein granting the request for the particular mobile gateway to access the particular network includes enforcing the one or more network policies.

15. A method, comprising:
identifying one or more models that correlate sets of access parameters, for access to a particular network, to one or more respective sets of mobile gateway parameters;
receiving a request, associated with a particular mobile gateway, to access the particular network;
identifying, based on the request, a particular set of mobile gateway parameters associated with the particular mobile gateway;
comparing the particular set of mobile gateway parameters, associated with the particular mobile gateway, to the sets of mobile gateway parameters included in the one or more models;
identifying a particular set of access parameters, associated with the one or more models, based on the comparing;
determining whether to provide access in response to the request based on the identified particular set of access parameters; and
selectively performing, based on the determining, one of:
denying the request for the particular mobile gateway to access the particular network, or
granting the request for the particular mobile gateway to access the particular network, wherein the mobile gateway provides connectivity between one or more User Equipment ("UEs") and the particular network when the request to access the particular network is granted.

16. The method of claim 15, wherein the particular mobile gateway communicates with the particular network via a licensed radio access technology ("RAT"), and wherein the particular mobile gateway communicates with the one or more UEs via an unlicensed RAT.

17. The method of claim 15, wherein the particular set of access parameters indicate one or more UEs, wherein the particular mobile gateway determines that the one or more UEs are indicated in the particular set of access parameters prior to providing connectivity between the one or more UEs and the particular network.

18. The method of claim 17, wherein the particular mobile gateway denies connectivity requests from UEs that are not indicated in the particular set of access parameters.

19. The method of claim 15, wherein the particular set of mobile gateway parameters indicate one or more locations, wherein the particular set of access parameters indicate a location of the particular mobile gateway, and wherein determining whether to provide access in response to the request based on the identified particular set of access parameters includes determining whether the location of the particular mobile gateway is within a threshold proximity of the one or more locations indicated in the set of mobile gateway parameters.

20. The method of claim 15, wherein the particular set of mobile gateway parameters include one or more network policies, wherein granting the request for the particular mobile gateway to access the particular network includes enforcing the one or more network policies.

\* \* \* \* \*